Patented June 14, 1949

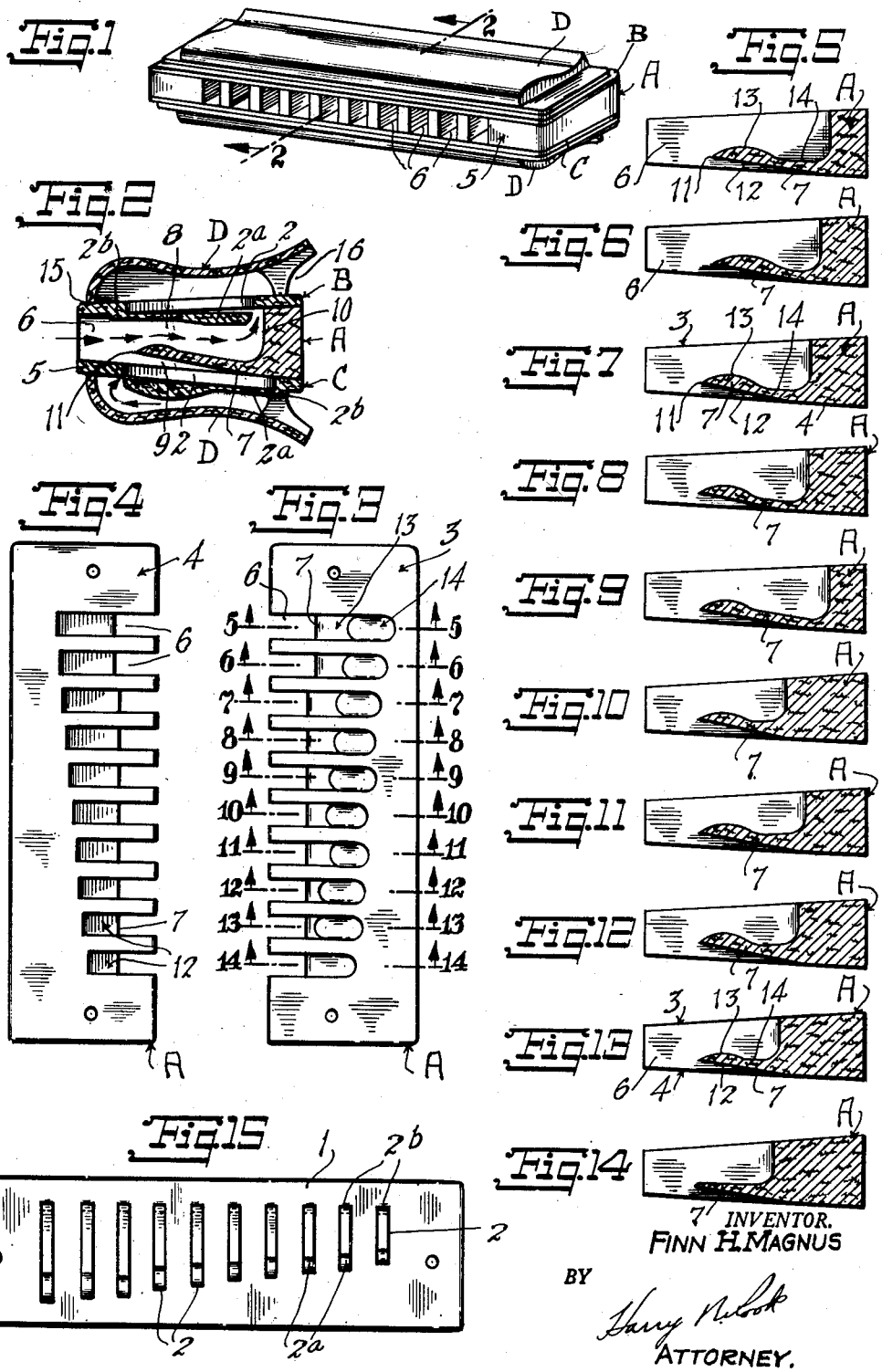
Fig. 1 — Fig. 15
INVENTOR.
FINN H. MAGNUS
BY
ATTORNEY.

2,473,210

UNITED STATES PATENT OFFICE

2,473,210

HARMONICA AND WIND CELL BLOCK THEREFOR

Finn H. Magnus, Essex Fells, N. J., assignor, by mesne assignments, to Magnus Harmonica Corporation, Newark, N. J., a corporation of New Jersey Application April 30, 1947, Serial No. 745,063

7 Claims. (Cl. 84—377)

This invention relates in general to harmonicas, and particularly harmonicas of the type including a wind cell block having wind cells which open through the mouth piece and having at opposite sides thereof a blow reed plate and draw reed plate, respectively, and covers forming sound chambers. The invention especially contemplates harmonicas made of synthetic resins or similar plastic compositions, such as polystyrene, for example, as described and claimed in my Patents No. 2,373,129, dated April 10, 1945, and No. 2,407,312, dated September 10, 1946.

Heretofore, in harmonicas of this type, uniformity of the volume of sound has been difficult to obtain and playing of the instruments cannot be effected with the desired ease and control.

Therefore, a prime object of the present invention is to provide in a harmonica novel and improved means whereby the air currents for vibrating the blow reed and draw reed of a common wind cell may be varied to obtain substantially uniform volume of sound from the two reeds and to permit playing of the instrument with a maximum of ease and control.

Another object is to provide a novel and improved construction and combination of a wind cell block, a blow reed plate and a draw reed plate wherein there shall be separate wind chambers for the corresponding blow reed and draw reed of each wind cell.

A further object is to provide such a wind cell block wherein said wind chambers shall be of a shape and capacity to ensure maximum efficiency in the vibration of the reeds by the air currents, so as to ensure uniform and large volume of sound, improved tonal qualities and ease in playing.

Other objects, advantages and results of the invention will be brought out by the following description in conjunction with the accompanying drawings, in which Figure 1 is a front perspective view of a harmonica embodying the invention;

Figure 2 is an enlarged transverse vertical sectional view, taken approximately on the plane of the line 2—2 of Figure 1;

Figure 3 is a plan view of the blow reed side of the wind cell block;

Figure 4 is a similar view of the draw reed side of the wind cell block;

Figures 5—14, inclusive, are transverse vertical sectional views on the respective lines 5—5, 6—6, 7—7, 8—8, 9—9, 10—10, 11—11, 12—12, 13—13 and 14—14 of Figure 3, and Figure 15 is a plan view of the blow reed plate.

For the purpose of illustrating the principles of the invention, I have shown it in a harmonica which includes a wind cell block A, a blow reed plate B, a draw reed plate C and covers or sound chamber plates D. Preferably all of these parts are formed of a synthetic resin, such as polystyrene, and the parts are secured together by softening of the contacting surfaces of the contacting parts with a suitable solvent of the synthetic resin and pressing of the parts into firm contact.

Each reed plate B and C includes a body portion 1 having reed slots 2 each secured at one end to one side of the reed plate in overlying relation to the corresponding reed slot, in a manner well known in the art.

The wind cell block A is preferably of a trapezoidal cross-section having broad surfaces 3 and 4 to receive the corresponding blow reed plate and draw reed plate, said surfaces converging to and intersecting the narrow edge 5 of the block which serves as a mouthpiece for the instrument. The block also has a plurality of wind cells 6, each for a pair of reeds, that is one blow reed and one draw reed, and these cells are in the form of slots that open through both sides 3 and 4 of the wind cell block and through the mouthpiece edge 5 thereof. Each cell is divided by a web or partition 7, so that when the reed plates are assembled with the wind cell block, separate wind chambers 8 and 9 are formed for the corresponding blow reed and draw reed, respectively, corresponding to said cell. These partitions extend from the rear ends 10 of the corresponding cells to a point in spaced relation to the mouthpiece edge 5, as indicated at 11; in other words, the partitions correspond approximately in length to the length of the reed slots. The cross-sectional shapes of said partitions also vary according to the desired shape and capacity of the wind chambers 8 and 9 of the respective reeds, and preferably the side of each partition that forms the bottom of the draw reed wind chamber 9 is substantially flat, as indicated at 12, while the side of said partition that forms the bottom of the blow reed wind chamber has merging convex and concave surfaces 13 and 14, respectively. The convex surfaces 13 tend to restrict the cross-sectional area or capacity of the inlet ends of the blow reed chambers adjacent the ends of the reeds that are attached to the reed plate, that is, the root or heel ends of the reeds, while the concave surfaces 14 provide enlargements of the wind chambers in proximity to the free ends of the reeds. The surfaces 12 of the draw reed chambers incline from adjacent the root ends of the draw reeds inwardly from the corresponding surface 4 of the wind cell block or in diverging relation to the corresponding draw reeds, so that the draw reed chambers 9 have their largest capacity or cross-sectional area in the proximity of the vibratory free ends of the reeds.

The capacity and shape of the wind chambers 8 and 9, and consequently the dimensions and shapes of the surfaces 12, 13 and 14 will be varied according to the size and vibratory characteristics of the respective reeds, which is best illustrated in Figures 3–14, inclusive.

As is usual in harmonicas, one of the cover plates D forms a common sound chamber for the blow reeds, while the other cover plate forms a common sound chamber for the draw reeds, said plates being in air-tight contact at one edge adjacent the mouthpiece with the corresponding reed plate, as indicated at 15, while the other edge of each cover or sound plate is spaced from the corresponding reed plate to form a sound outlet 16. If desired, the cover plates could be formed so as to produce a separate sound chamber for each reed, for example as shown in my Patent No. 2,340,333, dated February 1, 1944.

With this construction, it will be noted that the air currents entering the wind cells at the mouthpiece will be divided by the partitions 7 and the major portion of the exhaled air currents will pass through the blow reed chambers 8, the partitions having a tendency to restrict the flow of air through the draw reed chambers and consequently preventing minimum loss of air currents through the draw reeds. At the same time, the relatively smaller draw reed chambers compensate for the naturally smaller volume and velocity of the inhaled breath, so that in conjunction with the location of the vibrating end of the draw reeds nearer the mouthpiece and the larger capacity of the draw reed chambers adjacent said vibrating ends of the reeds, a maximum velocity of air currents is ensured to provide the desired intensity of vibration of the draw reeds. Better tonal qualities, greater stability and longer life of the reeds also result from the invention.

Having thus described the invention, what I claim is:

1. A harmonica including a wind cell block having a plurality of wind cells opening through one edge thereof to form a mouthpiece, there being a blow reed wind chamber and a draw reed wind chamber communicating with each wind cell and each opening through one of opposite sides of said wind cell block, a reed plate at each side of said block one having a blow reed for each blow reed wind chamber and the other having a draw reed for each draw reed wind chamber, the end portions of said blow reed wind chambers and said draw reed wind chambers remote from said mouthpiece being of greater and less capacity respectively than the other end portions of said chambers.

2. A harmonica as defined in claim 1, wherein the blow reeds and draw reeds are arranged with their vibratory ends at the end portions of their respective wind chambers having the greater capacity.

3. A harmonica as defined in claim 1, wherein the bottom walls of said blow reed wind chambers have convex surfaces at their ends nearer said mouthpiece merging into concave surfaces at their other ends, while the bottom walls of said draw reed chambers are substantially flat and are inclined from their ends nearer the mouthpiece toward the draw reed plate.

4. A harmonica as defined in claim 1, wherein the capacity of each draw reed wind chamber is substantially less than the capacity of the corresponding blow reed wind chamber.

5. A harmonica as defined in claim 2, wherein the capacity of each draw reed wind chamber is substantially less than the capacity of the corresponding blow reed wind chamber.

6. A harmonica including a wind cell block having a plurality of wind cells opening through one edge of said block to form a mouthpiece, a partition dividing each wind cell into a blow reed wind chamber and a draw reed wind chamber each opening through one of opposite sides of said wind cell block, the partition having a free edge disposed intermediate said opposite sides of said wind cell block and in remotely spaced relation to said edge of the wind cell block that forms said mouthpiece, a reed plate at each side of said block one having a blow reed for each blow reed wind chamber and the other having a draw reed for each draw reed wind chamber, the side of said partition in the blow reed chamber having merging convex and concave surfaces the former of which is disposed at the free edge portion of the partition, while the side of said partition that forms the bottom of the draw reed chamber is substantially flat and inclined from said free edge of the partition toward the draw reed plate, the blow reeds and draw reeds being arranged with their vibratory ends relatively closely and distantly spaced from said mouthpiece respectively.

7. A harmonica as defined in claim 6, wherein said partitions correspond approximately in length to the length of the corresponding reeds.

FINN H. MAGNUS.

REFERENCES CITED

The following references are of record in the file of this patent:

UNITED STATES PATENTS

| Number | Name | Date |
|---|---|---|
| 1,577,899 | Dusinberre | Mar. 23, 1926 |

FOREIGN PATENTS

| Number | Country | Date |
|---|---|---|
| 468,325 | Germany | Nov. 10, 1928 |